March 24, 1970 G. L. WISE 3,502,182
SELF-ADJUSTING MECHANISM
Original Filed Oct. 10, 1966
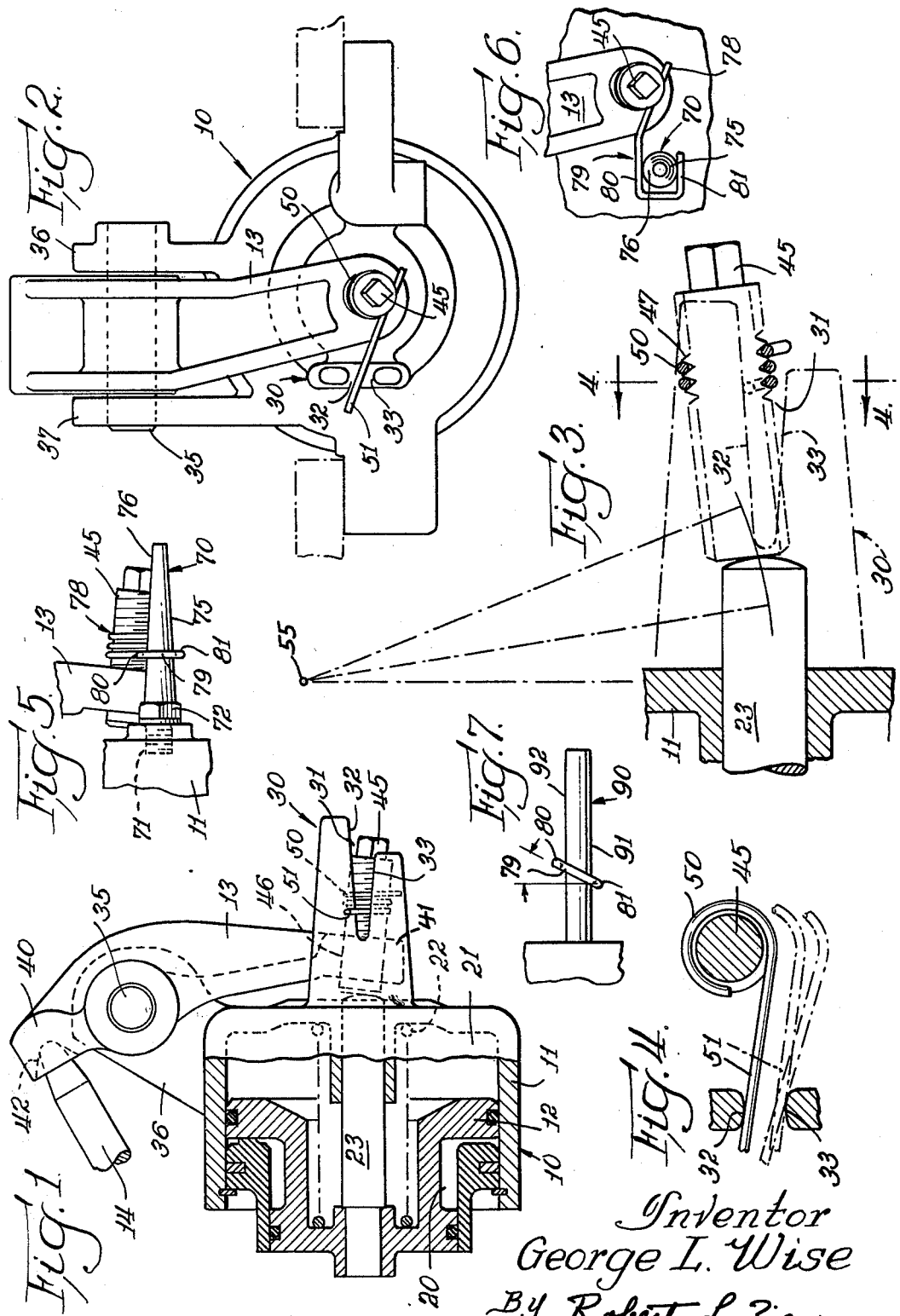
Inventor
George L. Wise
By Robert L. Zieg Atty.

United States Patent Office 3,502,182
Patented Mar. 24, 1970

1

3,502,182
SELF-ADJUSTING MECHANISM
George L. Wise, Muncie, Ind., assignor to Borg-Warner Corporation, Chicago, Ill., a corporation of Illinois
Continuation of application Ser. No. 585,398, Oct. 10, 1966. This application Jan. 23, 1969, Ser. No. 797,344
Int. Cl. H16d 13/75
U.S. Cl. 188—196   26 Claims

ABSTRACT OF THE DISCLOSURE

An adjusting mechanism wherein a fluid pressure responsive piston moves a pivoted lever to engage a friction device including a threaded adjustable screw in said arm having a coil spring surrounding said adjustable screw wherein cam means are provided on the housing containing the piston to engage the coil spring and thereby rotate the adjusting screw to provide an automatic adjustment to compensate for wear of the friction device.

This is a continuation of Ser. No. 585,398, filed Oct. 10, 1966, now abandoned.

This invention relates to a self-adjusting mechanism suitable for use in systems for engaging friction devices. The mechanism of the present invention is primarily designed to adjust for wear of the brake band of an automatic transmission but may be used in other environments to adjust for wear of a friction device.

Self adjusting mechanisms to compensate for wear of friction devices are well known in the art but generally are complicated in structure and operation. It is an object of the present invention to provide a simplified wear adjusting mechanism that is reliable in operation and can be incorporated into an existing structure with a minimum of expense and structural modification involved.

Other objects and features of the invention will be readily apparent to those skilled in the art from the specification and appended drawings illustrating a preferred embodiment in which:

FIGURE 1 is a view of a hydraulic servomotor for applying a friction device shown partially in section and including the adjusting mechanism of the present invention;

FIGURE 2 is an end view of the servomotor and friction device operating mechanism;

FIGURE 3 is a partial sectional view taken along the line 3—3 of FIGURE 2;

FIGURE 4 is a sectional view taken along the line 4—4 of FIGURE 3;

FIGURE 5 is a view of a modified form of adjusting mechanism;

FIGURE 6 is an end view of the structure of FIGURE 5; and

FIGURE 7 is a veiw of an additional modified form of adjusting mechanism.

Referring to the drawings there is illustrated a hydraulic servomotor 10. The hydraulic servomotor 10 includes a housing element 11 containing a fluid pressure-responsive piston or actuating means which is operatively associated with an operating lever element 13 which is pivoted on the housing 11. The lever 13 en-

2 gages a strut 14 to engage a friction device (not illustrated in the drawings).

Provided in the housing 11 is an apply fluid pressure chamber 20 and a release fluid pressure chamber 21. Within the chamber 21 is a spring 22 adapted to move the piston 12 to its utmost position to the left as illustrated in FIGURE 1. A rod 23 is connected to piston 12.

A fluid pressure port (not illustrated) would be provided in the housing 11 to supply fluid pressure to chamber 20 to move the fluid pressure piston 12 in an apply direction and a fluid pressure port (also not illustrated) would be provided in the housing 11 to supply fluid pressure to the release chamber 21 to move piston 12 in the release direction to the left. Thus the fluid pressure piston 12 has a release position as illustrated in FIGURE 1 and also has an apply position in which the piston would be moved to the right as compared to its position in FIGURE 1.

Integral with the housing 11 is a cam structure or operating means 30. The cam structure 30 as illustrated in FIGURE 1 is cast integral with the housing 11, however known ways of attaching are contemplated in which a cam structure would, for example, be bolted or welded on. The cam structure 30 comprises a slotted portion 31 thereon having an upper or first cam portion 32 and a lower or second cam portion 33.

Lever 13 pivots about a pin 35 which is mounted in a bifurcated section of housing 11 comprising arms 36 and 37. The lever 13 includes an upper driving end 40 and a lower driven end 41. The upper driving end 40 has a recess 42 therein in engagement with strut 14.

The lower or driven end 41 of lever 13 has a bolt 45 mounted within a threaded bore 46 in the lever 13. The bolt 45 has threads thereon which engage with the threads within bore 46 of lever 13 to secure the bolt 45 within the driven end 41 of lever 13. Encircling the bolt 45 and engaging threads 47 is a coil spring or actuatable means 50. The spring 50 has an extended arm 51 which is adapted to at times engage cam portions 32 or 33.

The spring 50 is wound in a clockwise direction as viewed in FIGURE 4 so that if the extended arm 51 of the spring is moved counterclockwise as viewed in FIGURE 4 the spring will tend to unwrap thereby releasing the bolt 45 and moving counterclockwise to a position on bolt 45 closer to the right end of bolt 45 as viewed in FIGURE 3. If the arm 51 of the spring 50 is moved in the clockwise direction the spring 50 will tend to wrap tightly upon bolt 45 and can thereby grip the bolt 45 securely and move the bolt 45 with spring 50. Thus the spring 50 comprises a one-way driving mechanism surrounding bolt 45.

The operation of the adjusting mechainsm of the present invention is as follows:

A point 55 is illustrated in FIGURE 3 which represents the geometric pivot point of lever 13. When fluid pressure is supplied to apply chamber 20 of the servometer 10 piston 12 will move to the right with the piston rod 23 engaging the end of bolt 45 to thereby pivot lever 13 counterclockwise about pin 35 to move strut 14 to engage the friction device (not illustrated). Thus the driving end 40 of lever 13 moves a normal predetermined distance to engage the friction device.

If the friction device has some wear thereon the driving end 40 of the lever 13 can move beyond the predetermined normal distance. When this movement beyond the predetermined normal distance takes place arm 51 of spring 50 will engage cam portion 32 as illustrated in FIGURE 3 so that the spring 50 will be moved in an unwrapping direction a small amount and move counterclockwise on bolt 45 as viewed in FIGURE 4 and slightly closer to the right end of bolt 45 as illustrated in FIGURE 3.

By means of the cam portion 32 the spring 50 has thus been conditioned for an automatic adjustment of bolt 45 so that when fluid pressure is supplied to release chamber 21 of servomotor 10 to move piston 12 to its release position as illustrated in FIGURE 1, the arm 51 of the spring 50 will operatively engage cam portion 33. Cam portion 33 will move arm 51 in a direction to wrap the coil spring 50 tightly about bolt 45 and rotate the bolt 45 a small amount in a clockwise direction as viewed in FIGURE 4 thus moving the bolt relative to lever arm 13 and toward piston rod 23. Thereby an automatic adjustment is provided between the rod 23 and the lever arm 13. Thus it will be seen that automatic adjustment will take place during operation of the brake applying mechanism including servomotor 10 and lever 13 whenever any wear has taken place on the friction device.

Referring to FIGURE 5 a modified form of an adjusting mechanism is illustrated. In the structure of FIGURE 5 a tapered or conical pin 70 is secured in the servomotor housing 11. The pin 70 has a threaded end 71 and a nut 72 formed adjacent thereto so that the pin may be tightly secured in place by turning of the nut 72. The pin 70 could also be press-fitted into the housing 11. The pin 70 has a lower cam surface 75 and an upper cam surface 76 as viewed in FIGURE 5. The pin 70 is conical, however, as illustrated in FIGURE 5, the profile of the upper and lower edges of the pin constitutes the effective cam areas on the pin during the operation of wear-adjusting mechanism. A wire spring 78 is coiled about the threads of the adjusting bolt 45 in a like manner to the structure described with regard to FIGURE 1. However, the spring 78 has an arm 79 which, rather than being straight as is arm 51 of the FIGURE 1 structure, has a U-shaped configuration having an upper side 80 and a lower side 81. The U-shaped configuration of arm 79 as assembled and shown in FIGURE 6 partly surrounds the tapered pin 70.

The operation of the adjusting mechanism of the embodiment illustrated in FIGURE 5 is similar to that of the mechanism of FIGURES 1 and 2, however, in effect an external type cam is utilized rather than an internal cam. The mechanism of FIGURE 5 will operate to adjust the position of the lever 13 with regard to the piston of the servomotor to compensate for wear of the friction band of a transmission as does the mechanism of FIGURE 1.

When the piston 12 of the servomotor moves to its apply position a lever 13 will move to the right as viewed in FIGURE 5. During this movement, if there has been some band wear, the lower side 81 of arm 79 will engage the cam surface 75 of pin 70 which will move the arm 79 downwardly a slight amount which tends to unwrap the spring 78 and move the same relatively to the right (as viewed in FIGURE 5) with respect to the bolt 45. This unwrapping movement has thus conditioned the mechanism to make an automatic adjustment for band wear. When the servomotor piston 12 moves to its release position, since there has been some movement of arm 79 in an unwrapping direction when the lever 13 moves back to its position as illustrated in FIGURE 5 upon piston 12 assuming its release position, the upper side 80 of arm 79 will now engage the upper cam surface 76 of pin 70 which will move the arm 79 in an upward direction which tends to wrap the spring 78 tightly about bolt 45 and will turn the bolt 45 clockwise a slight amount to move the bolt inwardly to make an adjustment for band wear. Thus the mechanism of FIGURE 5 works in a very similar manner to that of FIGURE 1 but constitutes an optional means of providing a cam on the housing of the servomotor to perform the adjusting function.

Referring to FIGURE 7, a further modified embodiment is illustrated wherein a straight cylindrical pin 90 is illustrated which has a lower cam surface 91 and an upper cam surface 92. A spring, 78, similar to that shown in FIGURES 5 and 6 is utilized, the spring again having a U-shaped section with an upper side 80 and a lower side 81 similar to the structure illustrated in FIGURE 6. The pin 90 is pressed into the housing 11 of the servomotor at a right angle to the end surface of housing 11 and parallel to the axis of piston 12. The arm 79 as illustrated has been bent at an angle which would be necessary to obtain the proper relationship to pin 90 for the adjusting function. The structure illustrated in FIGURE 7 works in a similar manner as that in FIGURES 5 and 6 as the lever 13 moves to the apply direction. Due to the effective radius from its center pivot to the point where the adjusting spring 78 is mounted, if there has been any wear of the friction band the travel of the lever arm will be longer than previously and the lower side 81 of the arm 79 will engage lower cam surface 91 on the pin 90. The arm 79 is moved in the direction to unwrap spring 78 and move same about the threads of bolt 45 in an unwrapping direction. Since the arm 79 has been moved relatively down, as would be illustrated in FIGURE 6, the upper side 80 of the arm 79 will engage cam surface 92 when the lever arm returns to the disengaged position whereby an automatic adjustment takes place by means of cam surface 92 moving the arm 79 upwardly as illustrated in FIGURE 6 to wrap the spring tightly about the bolt 45 and move the same in a clockwise direction, thereby compensating for wear of the friction band.

From the above it will be apparent that the present invention provides a novel and inexpensive method of incorporating an automatic adjusting device in a friction engaging structure. The coil spring such as spring 50 of FIGURE 1 replaces a locking nut normally provided on bolt 45 which is utilized when making a manual adjustment of bolt 45 as is known in the prior art. The cam mechanism 30 of FIGURE 1 can be conveniently cast integral with the housing 11 for the servomotor 10 and requires little machining thereon due to accurate casting methods now known in the prior art. Likewise, the constructions of FIGURES 5 and 7 wherein a cam is formed by assembling either a straight or tapered pin to the housing is a simple and inexpensive way of providing a cam actuator for the adjusting mechanism. The wear adjusting structure, as will be apparent, can be used in other mechanisms where a pivoted lever is moved to engage a friction device or perform other work and to adjust for movement of the lever beyond its normal predetermined distance.

What is claimed is:

1. An automatic adjusting mechanism comprising a housing element, a lever element pivoted on said housing having a driven end and a driving end, actuating means within said housing element, adjusting means comprising a rotatable means mounted in one of said elements between said driven end of said lever element and said actuating means, said driving end of said lever element adapted to move a predetermined distance, actuatable means encircling said rotatable adjustment means, operating means comprising cam means on the other of said elements adapted to engage said actuatable means, and said cam means being operative to engage said actuatable means and provide an automatic adjustment of said adjustable means when the driving end of said lever moves beyond said predetermined distance.

2. An automatic adjusting mechanism as claimed in claim 1 wherein said operating means comprises cam means integral with said housing, said cam means being operative to engage said actuatable means and provide an automatic adjustment of said adjustable means when the driving end of said lever moves beyond said predetermined distance.

3. An automatic adjusting mechanism as claimed in claim 2 wherein said cam means comprises a slot integral with said housing, said actuatable means extending through said slot.

4. An automatic adjusting mechanism as claimed in claim 2 wherein said cam means comprises a pin integral with said housing, said pin being partly encircled by said actuatable means.

5. An adjusting mechanism as claimed in claim 4 wherein said pin is tapered.

6. An automatic adjusting mechanism as claimed in claim 2 wherein said actuatable means comprises a coil spring.

7. An automatic adjusting mechanism as claimed in claim 2 wherein said cam means has a first portion and a second portion, said actuating means having a released position and an apply position whereby when said actuating means moves to its apply position to move the driving end of said lever a predetermined distance said actuatable means will engage said first portion of said cam if said driving end moves beyond said predetermined distance whereby the position of said actuatable means on said adjusting means will be changed so that when said actuating means returns to its release position said second portion of said cam will engage said actuatable means and said driven end of said lever.

8. An adjusting mechanism as claimed in claim 4 wherein said housing comprises a hydraulic cylinder and said actuating means comprises a fluid pressure responsive piston.

9. An automatic adjusting mechanism as claimed in claim 7 wherein said driving end is operative to engage a friction device said automatic adjustment compensating for wear of said friction device.

10. An automatic adjusting mechanism for a friction engaging device including a pivoted arm for engaging said friction engaging device, a cylinder having an actuating means therein, a rotatable adjustable means mounted on one end of said pivoted arm, a spring encircling said adjustable means, said actuating means operatively engaging said adjustable means, cam means integral with said cylinder and engageable with said spring, said actuating means having a friction device engaging position and a release position whereby when said actuating means moves to said apply position said pivoted arm will pivot to engage said friction device when said arm pivots to an extent corresponding to wear of said friction device said cam will engage said spring to change the position of said spring on said adjustable means so that when said actuating means returns to its release position said cam will again engage said spring thereby rotating said adjustable means to provide automatic adjustment of said mechanism for wear of said friction device.

11. An automatic adjusting mechanism as claimed in claim 10 wherein said cylinder includes a fluid chamber and said actuating means comprises a piston within said chamber.

12. An automatic adjusting mechanism as claimed in claim 11 wherein said spring comprises a coil spring encircling said adjustable means.

13. An automatic adjusting mechanism as claimed in claim 10 wherein said cam has first and second portions so that when said piston moves to the apply position a first portion will engage said spring if said friction device has any wear and change the position of the spring on said adjustable means thereby positioning the spring so that when said piston moves to its released position a second portion of said cam will engage said spring to rotate said spring and thereby said adjustable means to automatically compensate for wear of said friction device.

14. An automatic adjusting mechanism as claimed in claim 13 wherein said coil spring is adapted to be moved in an unwrapping direction when engaging said first portion of said cam and adapted to be moved in a wrapping direction and thereby rotate said adjustable means when engaging said second portion of said cam.

15. An automatic adjusting mechanism as claimed in claim 10 wherein said cam means comprises a pin secured in said cylinder.

16. A mechanism as claimed in claim 15 wherein said pin is tapered.

17. An automatic adjusting mechanism comprising a housing element, a lever element mounted for pivotal movement and having a driven end and a driving end, an actuating element within said housing element, adjusting means comprising a rotatable means mounted in one of said elements between said driven end of said lever element and said actuating means, said driving end of said lever element adapted to move a predetermined distance, actuatable means encircling said rotatable adjusting means, operating means comprising cam means on one of said other elements and adapted to engage said actuatable means, and said cam means being operative to engage said actuatable means and provide an automatic adjustment of said adjusting means when the driving end of said lever moves beyond said predetermined distance.

18. An automatic adjusting mechanism as claimed in claim 17 wherein said cam means is secured to said lever element.

19. An automatic adjusting mechanism as claimed in claim 18 wherein said cam means comprises a pin integral with said lever element.

20. An automatic adjusting mechanism as claimed in claim 18 wherein said actuatable means comprises a coil spring.

21. An automatic adjusting mechanism for a friction engaging device including a pivoted arm element for engaging said friction engaging device, a cylinder element having an actuating element therein, a rotatable adjustable means mounted in one of said elements, a spring encircling said adjustable means, cam means integral with another of said elements engageable with said spring, said actuating element having a friction device engaging position and a release position whereby when said actuating element moves to said apply position said pivoted arm will pivot to engage said friction device when said arm pivots to an extent corresponding to wear of said friction device said cam will engage said spring to change the position of said spring on said adjustable means so that when said actuating element returns to its release position said cam will again engage said spring thereby rotating said adjustable means to provide automatic adjustment of said mechanism for wear of said friction device.

22. An automatic adjusting mechanism as claimed in claim 21 wherein said cylinder includes a fluid chamber and said actuating means comprises a piston within said chamber.

23. An automatic adjusting mechanism as claimed in claim 22 wherein said spring comprises a coil spring encircling said adjustable means.

24. An automatic adjusting mechanism as claimed in claim 21 wherein said cam has first and second portions so that when said piston moves to the apply position a first portion will engage said spring if said friction device has any wear and change the position of the spring on said adjustable means thereby positioning the spring so that when said piston moves to its released position a second portion of said cam will engage said spring to rotate said spring and thereby said adjustable means to automatically compensate for wear of said friction device.

25. An automatic adjusting mechanism as claimed in claim 24 wherein said coil spring is adapted to be moved in an unwrapping direction when engaging said first portion of said cam and adapted to be moved in a wrapping direction and thereby rotate said adjustable means when engaging said second portion of said cam.

26. An automatic adjusting mechanism as claimed in claim 21 wherein said cam means comprises a pin secured in one of said elements.

References Cited

UNITED STATES PATENTS

| | | |
|---|---|---|
| 2,889,896 | 6/1959 | Schulz et al. |
| 2,940,553 | 6/1960 | Newell et al. _____ 188—196 |
| 3,103,991 | 9/1963 | Flinn. |
| 3,331,476 | 7/1967 | Livezey. |

DUANE A. REGER, Primary Examiner

U.S. Cl. X.R.

192—111